UNITED STATES PATENT OFFICE.

VALENTIN VAUCAMPS, OF PARIS, FRANCE.

PROCESS OF PRODUCING PHOTOGRAPHS IN COLORS.

SPECIFICATION forming part of Letters Patent No. 608,934, dated August 9, 1898.

Application filed November 5, 1896. Serial No. 611,163. (No specimens.) Patented in France December 5, 1895, No. 252,207.

*To all whom it may concern:*

Be it known that I, VALENTIN VAUCAMPS, a citizen of the Republic of France, residing in Paris, France, have invented a Process of Chromophotography, (for which I have obtained a French patent, dated December 5, 1895, No. 252,207,) of which the following is a specification.

The process of chromophotography which forms the subject of the present invention is based upon the researches which I have made with the object of determining the constitution of photographic plates. On the subject of this constitution I have made the following determinations, from which I have deduced the principles which serve as a basis for my invention:

The colors of objects photographed make an impression upon the sensitized plate or film of the photographic negative each after its manner and in a different fashion. It is the same with lighted or obscure parts. They create in the negative differences of transparency of the sensitized layer in a perfectly-defined order, extending from the indigo of the solar spectrum to red. From this it follows that the transparent parts and the lightest half-tints of the negative correspond inversely to the obscure parts or to the dark half-tints of the object photographed, and that for colored parts, as well in their complete totality as in their half-tints, the darkest parts of the negative correspond to the actions of the colored rays upon the sensitized layer—that is to say, they gradually increase in intensity from the red to the indigo of the spectrum. Accordingly it may be said that when once the negative is obtained the variations in transparency which it presents are in the order of the tonalities and of the colors of which it has received the impression. If, then, I reproduce upon the picture obtained with this negative and in suitable order the causes which have determined upon the negative the action of the object photographed, this will be the object itself which is reproduced upon the picture.

I have hereinbefore stated that the differences in transparency of the negative follow an order extending from the indigo of the solar spectrum to red. It is therefore with a view to this order that the sensitive layer of the picture has to be constituted. The following is the manner in which I effect this object:

In order that the explanation of my process may be rendered easier, I will suppose that it is desired to reproduce an object presenting three colorations only—that is to say, blue, yellow, and red. The negative made from this object will present different degrees of transparency in the order of the colors. Thus it will be very transparent in the parts corresponding to red, dark in those corresponding to yellow, and still darker in those corresponding to blue. Therefore it shows differences of opacity corresponding to the colors of which it has received the impression. For reproducing these differences upon the picture and translating them into colorations similar to those of the object I proceed in the following manner: Upon an appropriate surface I spread a first layer, which is sensible or sensitized or which will be sensitized later on prior to the exposure to the light, which I have colored red beforehand. Upon this layer I spread a second yellow color and then upon this a third blue color. If I expose the surface thus prepared to the action of the light under the corresponding negative, I obtain an impression of the sensitive layer which is very strong for the most transparent part of the negative (that corresponding to red) and which will thence continually lessen, passing through the part corresponding to yellow to the part corresponding to blue. The following will take place at the time of the development, for example, of a picture with mucilages bichromated in lukewarm water after transfer and after removal of the paper which supported it before this transfer. As in consequence of the said transfer the red is at the surface, the parts of the layer which inclose it and which have been reached by the light are insoluble, the others will be dissolved and will lay bare the layers inclosing the yellow colorations, whose parts reached by the light will be insoluble, and the others not reached will be dissolved, allowing to appear the parts of the blue layer reached by the light and whose parts not reached by the light will be dissolved in their turn and allowed to appear the support if there are white parts in the object photographed. Accordingly the picture will reproduce in an identical order the colorations of the photographed object, which have made an impression upon the negative.

From the foregoing it will be seen that the means which I use for reproducing the colorations of the object photographed consist in covering a suitable surface with successive sensitive or sensitized layers or layers which are subsequently sensitized prior to the exposure to the light, in which I incorporate beforehand colors in such a manner that the whole of these successive layers, which constitute the material of which the picture is formed, corresponds to the more or less transparent parts, which in the negative is determined by the exposure of the latter in the dark chamber in the presence of the subject to be photographed. The picture being thus constituted of successive sensitive or sensitized layers, diversely colored, is then exposed under the negative in the ordinary manner. When the exposure has taken place, the various layers of the picture have received an impression according to the nature of the negative, and it is sufficient to develop the picture, as hereinbefore specified, for laying bare the colored surfaces or the parts of these surfaces, so that the negative incloses them in the state of more or less transparent tints.

It will be understood that with my process, by multiplying the number of layers of the picture so as to introduce into the same the scale of the colors with their half-tints, I succeed in producing colored images reproducing subjects with the most diverse colorations and with the degree of intensity of these colorations.

In lieu of the order of the colors hereinbefore stated I may also invert this order to obtain optional or imaginary effects.

It will scarcely be needful for me to add that any colors and any coloring materials which may be incorporated in the sensitive or sensitized layers or such as may be sensitized, of which I form my pictures, are suitable for my process without any need for specifying them otherwise. The same is the case with materials which are sensitive themselves or which must be sensitized, which I arrange one above the other in order to form my pictures. These materials may be any one of those heretofore used in photography, and I may employ them either together or separately, in order to form layers of the same composition or of different position upon the same picture, so as to modify, according to the requirements of the photographed subject, the effects of the sensitiveness during the exposure. Lastly, I may constitute my pictures either in the state of plates, or in the state of papers, or in the state of films.

In the case of films I may color them either by preserving their transparency or by rendering them semitransparent by the incorporation of a white color, or of any colors or tints to form a ground at the same time as a support for one or more of the colored layers hereinbefore described.

For the manufacture of my plates, films, or papers I may proceed by letting a layer dry before pouring another on the top, when use is made of one of the sensitive materials or materials which must be sensitized, as hereinbefore mentioned, including gelatin. However, in the case of this latter body I prefer to allow the first-deposited layer to set by lowering, if necessary, its temperature by artificial means. I then pour upon this first layer thus set and cooled, but not yet dried, the second layer, the mixture of which has previously been melted in a water-bath at a temperature of $+45°$ or $55°$, then brought to $+30°$ or $40°$ prior to the pouring on, &c., to the last layer. By this means the gelatinous mixture ready to be poured on possesses a sufficient degree of heat for remaining fluid, without, however, being hot enough for melting the humid and set layer upon which it has to be spread. I vary, moreover, the temperature according to the quantity of gelatin contained in the mixture, the quality of the gelatin, and the ambient temperature at the moment of the pouring on. This mode of procedure imparts to the different layers a great adhesion between each other. They are no longer susceptible of splitting up in the dry state or in the development, which often occurs with layers placed in the fluid state upon layers which are already dry.

The picture hereinbefore referred to must be viewed by reflection, for by transparency the effect is no longer the same, by reason of the superposition of the colored layers existing below those which the development has rendered visible by reflection. With the aid of a simple manipulation I may, however, render the same pictures visible by transparency or by reflection. In this case I effect the development upon paper coated with collodion or india-rubber, and I transfer the picture upon a very plane glass plate. The reliefs which the development had caused at the surface of the picture being forced to the rear in contact with the plane of the glass plate reappear naturally at the back of the picture; but it should be observed that these reliefs contain colored layers which remain without effect in the result obtained, because they are masked by those which the development has alone laid bare. If I remove what may take place in the dry or in the moist state with the aid of a grindstone or any other means these layers which now form projections at the back of the picture, there will adhere to the glass plate only the layers or the parts of colored layers which contribute to the formation of the picture, and the latter will then be visible as well by transparency as by reflection.

What I claim is—

The process of producing photographic prints exhibiting a plurality of colors, visible by transparency as well as by reflection, which consists in applying to a backing, a series of sensitized or sensitizable layers of different colors, exposing the layers to light under a negative to render portions of the layers insoluble, washing the picture with an appropriate solvent so as to produce a relief on its front or exposed face, pressing said exposed face against a plane or smooth support so as to destroy the relief on the front face and bring it out on the back, and removing the projecting portions on the back, substantially as described.

In testimony whereof I have signed my name to this specification in the presence of two subscribing witnesses.

VALENTIN VAUCAMPS.

Witnesses:
LION FRANCKENS,
H. T. SMITH.